Feb. 27, 1951     A. C. SCINTA ET AL     2,543,383
WINDSHIELD CLEANER
Filed July 28, 1944
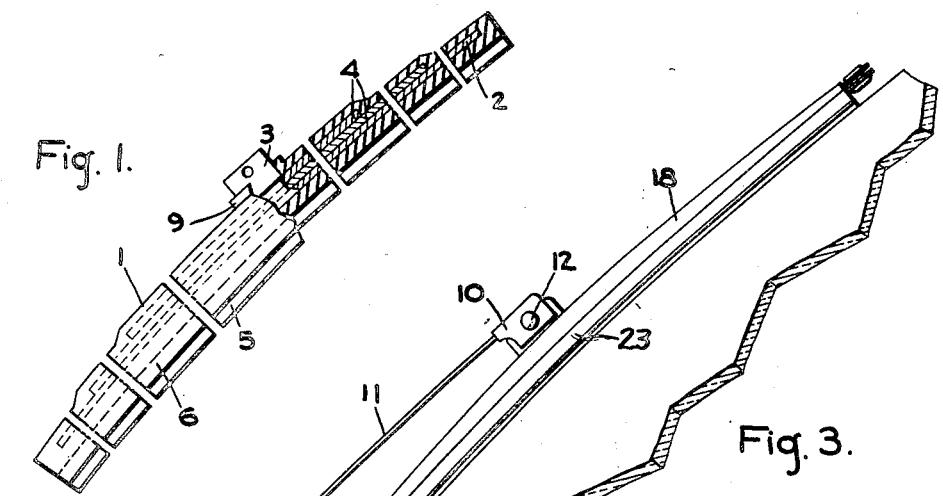
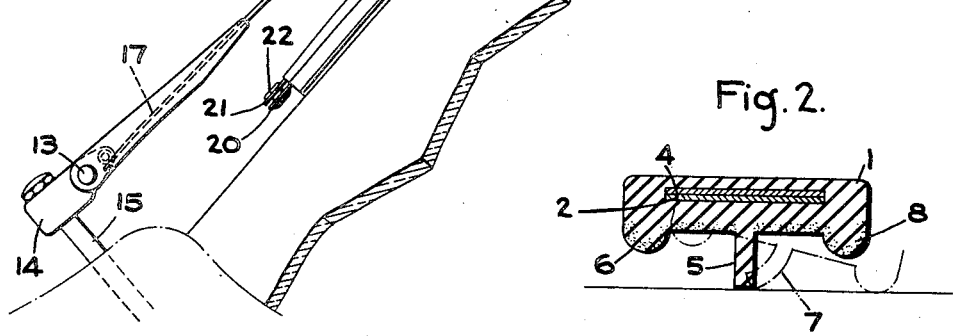
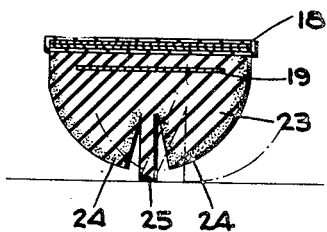
INVENTOR
ANTHONY C. SCINTA AND ANTON RAPPL
BY
Bean, Brooks, Buckley & Bean, ATTORNEYS Patented Feb. 27, 1951

2,543,383

UNITED STATES PATENT OFFICE 2,543,383

WINDSHIELD CLEANER

Anthony C. Scinta, Buffalo, and Anton Rappl, Eggertsville, N. Y., assignors to Trico Products Corporation, Buffalo, N. Y.

Application July 28, 1944, Serial No. 546,968

19 Claims. (Cl. 15—245)

This invention relates to the window cleaning art and primarily to the cleaning of windshields of automotive vehicles such as automobiles, airplanes, and sea-going craft. The greatest efficiency in wiping moisture from a windshield is secured by moving a thin ply or strip of rubber or like rubbery material over the glass surface to lap over or smooth out the remaining thin film of moisture subsequent to the removal of excess moisture by a preceding wiping edge. This has heretofore been accomplished efficiently by the well known multi-ply type of blade long used on automobiles. To adapt such efficient squeegee construction to a curved surface would be impractical if not impossible because of structural barriers.

The primary object of the present invention is to provide a wiper or squeegee which will be efficient and effective in cleaning flat as well as curved windshield surfaces. Further, the invention has for its object to provide a squeegee which will be durable and one which will readily conform itself to the windshield surface in maintaining a clear field of vision for safe driving.

An equally important object is to construct a wiper of rubbery material having plural wiping portions with varying coefficients of friction cooperating to jointly wipe the surface in an effective and efficient manner.

In the drawing:

Fig. 1 is an illustration, partly in section, showing the improved windshield wiper in its preferred embodiment;

Fig. 2 is a cross sectional view through the wiper;

Fig. 3 is a side elevation of a modification embodying the inventive concept; and Fig. 4 shows in cross section the modified wiper.

Referring more particularly to the drawing, the windshield wiper, which is shown as being curved in a longitudinal direction, has a body 1 preferably of molded elastic rubber, the term rubber being used herein in a broad sense and inclusive of like rubbery material whether natural or synthetic. Backing means are provided for this elastic body to give support thereto throughout its length and at the same time to conform it to the surface being wiped. In Fig. 1 the backing means comprises a flat spring 2 to which is secured the arm-attaching ear or fin 3, as by a swaging action. Reinforcing leaves 4 superimposed upon the base or flat spring 2 may be secured into a unit by the fin 3 to provide a backing in the form of a leaf spring. This leaf spring or backing unit is incorporated in the rubber body to be wholly concealed and protected thereby. Preferably the leaves are free of any adhesion with the inclosing rubber body so as to move relative to each other as they yield in conforming the body to the surface being wiped. The backing spring is thereby provided with an elastic envelope and normally imparts to the latter the longitudinal curvature.

The active face of the wiper body comprises a primary wiping edge in the form of a readily flexible rib 5 for lapping over or smoothing out the thin film of moisture remaining after the bulk of the water has been removed by a heavier but preceding wiping edge 6. Two of these secondary wiping edges 6 are provided one on each side of the primary or central rib, each secondary wiping edge being in the form of a relatively heavy and self-sustaining bead to act in a scrubbing capacity upon the surface. The rib 5 extends beyond the plane of the two beads 6 so as to contact the surface initially and in fact to remain in constant engagement therewith throughout its back and forth operation though flexing at the start of each stroke to assume a dragging position, as indicated by the broken lines 7 in Fig. 2. The beads alternately contact the glass or other surface by dipping down thereon in advance of the wiping rib 5. This dipping action of the beads 6 is caused by the rib 5 as it traverses the surface due to its frictional engagement therewith, and to enhance or augment this frictional contact said rib is preferably given a higher coefficient of friction as compared to that of the wiping beads 6. This differential friction coefficient may be provided by chemical treatment to the beads while leaving the primary wiping edge or rib 5 with a surface having a greater cling factor. Such case hardening of the beads is indicated by the stippling 8. This chemical reaction may be accomplished by first protecting the wiping rib, so that the wiping rib not only possesses a greater degree of flexibility but also has the characteristic of being more tenacious than the preceding wiping bead. The body of the wiper is preferably of greater width than thickness, with the wiping beads spaced laterally from the wiping rib so that the tendency of the body to roll or turn over under the clinging action of the wiping rib will be limited and resisted by the beads as they contact the glass.

In this connection it will be noted that the leaf spring backing is quite yieldable to a twisting action and the point of the drag imposed primarily by the clinging rib 5, being out of the plane of the leaf spring, will provide a rotating couple that tends to twist the wiper body. Since the twist is contributed to by contact all along the wiping face and the wiper is supported intermediate its ends by the fin 3, all of the twisting action that is applied between any given point and such point of mounting is effective only on that part of the leaf spring backing. There is a gradual accumulative twisting effected, each portion of the blade having more and more of a twist toward the opposite ends. This condition provides a means of adjustment between the clinging rib and the freer sliding beads so as to prevent any chattering of the wiper, the graduated application of the sliding relief tapering off from the mounting fin toward the free ends of the body.

The elastic body may be provided with a collar 9 extending up and about the mounting fin 3 to be firmly gripped by the straddling parts 10 at the outer end of the wiper arm 11, the wiper being attached to the arm by a fastener 12 preferably in a manner to avoid all lateral rocking of the mounting fin on the arm. This confines the action of the imposed torque to the resiliency of the wiper body and its spring backing. The wiper arm section 11 is pivotally mounted at 13 on an inner section 14 which is suitably secured to the actuating shaft 15, the outer end of the arm being urged toward the windshield surface 16 by means of a spring 17 for providing the wiping pressure.

The resilient backing 18 may be provided separate and distinct from the wiper unit as shown in Figs. 3 and 4. The wiper unit has its elastic body 23 provided with a supporting flat metal strip or tension member 19, the ends of which are extended as at 20 for being coupled with the ends 21 of the pressure distributing backing or yoke 18 preferably through a play connection as provided by the fasteners 22. The backing strip 19 combines with the arched shaped bracket or holding structure 18 to form a supporting frame in which one side constitutes a non-extensible though surface conforming support for the rubber body and may be imbedded in the latter as a means for joining the two elements, the body and the strip, into a wiper unit. By this means the spring pressure of the arm is applied through the backing bracket or holding structure 18 directly to the backing strip 19 which latter not only suspends the rubber body 23 between the fasteners 22 and affords support for the intermediate body portion thereof, but it also supports the body against lateral distortion while the wiper is moving sidewise. Similarly, the body is supported by the strip 19 against lengthwise distention should there by a tendency for the body to stretch. The backing spring 18 may likewise be of leaf construction and enclosed within a protective envelope of rubber as shown, and while the wiping body 23 of rubber is free of its backing support throughout its length, nevertheless when the wiping face is brought into contact with the glass surface such wiper body will nest into the normally curved backing 18 so that the latter will conform the wiping face to the contour of the surface. As shown in Fig. 3, the bracket member 18 and the backing strip 19 have their opposite longitudinal margins adjacent their points of attachment bearing upon each other in a plane parallel of the body 23 and therefore at opposite sides of the wiping edge 25. This arrangement affords lateral support for the wiper unit tending to counteract the turning of the backing strip 19 about its longitudinal axis.

In this modification, and referring particularly to Fig. 4, the bead formations 24 are contoured somewhat differently and brought closer together to constitute flex-limiting shoulders for the laterally flexible wiping rib 25 with sufficient clearance to cause the latter to assume a dragging position as shown by the broken lines. When in such dragging position the trailing and inactive wiping bead will give support thereto for greater wiping pressure in the contact between the rib and the glass.

It will be understood that the embodiments described and shown herein are merely illustrative of the inventive principles involved, which latter may be applied to other physical embodiments without departing from the scope and spirit of the invention claimed.

What is claimed is:

1. A windshield wiper for curved surfaces comprising a body of rubbery material having a laterally flexible wiping rib with laterally spaced self-sustaining wiping bead portions on opposite sides of the flexible rib for alternate wiping contact with the surface in advance of said flexible rib as the body is moved back and forth over the curved surface, and means carried by the body and yieldably acting on the latter normally to conform the same to the curvature of the surface, said conforming means extending laterally of the wiping rib to give support to the bead portions, said wiping rib having a greater coefficient of friction and projecting normally to a greater extent than said laterally spaced bead portions whereby when the wiping rib clings to the surface it will tend to twist the body with its conforming means to bring the preceding bead portion down into wiping contact with the surface.

2. A windshield wiper comprising an elongated elastic body having a longitudinally extending laterally flexible wiping rib with spaced self-sustaining wiping beads spaced therefrom on opposite sides thereof for alternate wiping contact with the surface in advance of said wiping rib as the body is moved back and forth over a surface, said wiping rib extending further from the body than said wiping portions and possessing a greater coefficient of friction so as to impose a dragging torque upon the body to bring the advancing wiping portion down into wiping contact with the surface, and a reinforcing backing for the body coextensive in width with the spacing of the beads and acting to resiliently conform the body to the surface being wiped.

3. A windshield wiper blade for a curved surface, comprising an elongated rubbery body having a wiping edge, and a leaf spring backing for the body shaped to urge the wiping edge into contour contact with the curved surface while giving body support against lateral flexing, said backing spring having plural leaves acting one upon another with their broad faces extending transversely of the wiper to flex toward and from the curved surface.

4. A windshield wiper blade for curved surfaces comprising an elongated elastic body having a wiping face with a flexible wiping rib interposed between side wiping beads having a relatively lower coefficient of friction, and a multi-leaf flat spring backing the wiping face and shaped to act thereon normally to conform the latter to the curvature of the surface, said spring extending in width transversely of the wiper body and normal to the plane of the rib and serving to give lateral support to the body against flexing.

5. A windshield wiper blade for a curved surface, comprising an elongated rubbery body having a wiping face with a laterally flexible wiping rib and laterally spaced self-sustaining wiping portions on opposite sides of the flexible rib acting to support the latter against collapsing, and a plural leaf spring backing the wiping face substantially throughout its length and flexing toward and from the surface to conform the body to the curvature of the surface, the leaves of the spring being inclosed by and within the rubbery body with the individual leaves being free from adhesion to the body.

6. A windshield wiper blade for curved surfaces, comprising an elongated body of rubbery material having a laterally flexible wiping rib, and a spring leaf within the body flexed toward the surface normally to conform the same to the curvature of the surface, and means for attaching the wiper to an actuating arm in the form of a fin riveted to the spring leaf and projecting upwardly therefrom through the back of the body.

7. A windshield wiper blade for a curved surface, comprising an elongated rubber body having a wiping face with a laterally flexible wiping rib, a leaf spring within the rubber body acting on the latter normally to conform the wiping face to the curvature of the surface, and means mounted upon the leaf spring for attaching the wiper to an oscillatory actuating arm, said mounting means being disposed closer to the outer ends of the spring leaves with respect to the axis of oscillation and consequently closer to the outer end of the wiper thereby to resist the twisting tendency in such faster moving outer end.

8. A windshield wiper blade for curved surfaces, comprising an elongated body of rubbery material having a laterally flexible wiping rib, a leaf spring enclosed by the body and yieldably acting on the latter normally to conform the wiping rib and said wiping portions to the curvature of the surface, a wiper attaching member carried by the leaf spring intermediate its ends and protruding through the back of the rubbery body, the wiper being free to twist to a progressively greater extent toward its opposite ends.

9. A windshield wiper blade for curved surfaces, comprising an elongated body of rubbery material having a laterally flexible wiping rib with laterally spaced self-sustaining wiping portions on opposite sides of the flexible rib for alternate wiping contact with a curved surface in advance of said flexible rib as the body is moved back and forth over the curved surface, means yieldably acting on the body normally to conform the latter to the curvature of the surface, said conforming means being in the form of a tension member extending longitudinally of and carried by the body, and a supporting member having resilient terminals connected to the ends of the tension member for yieldably suspending the intermediate portion of the body for movement toward and from the surface for conforming engagement therewith.

10. A windshield wiper blade comprising an elongated body of rubbery material having a substantially coextensive laterally flexible wiping rib and laterally spaced self-sustaining beads on opposite sides of the flexible rib for alternate contact with the surface in advance of said flexible rib as the body is moved back and forth over the surface, and a strip-like backing member of greater width than the ribs said laterally spaced beads being supported by the opposite margins of the backing member and acting to limit the tendency of the body to roll under the dragging urge of the wiping rib.

11. A windshield wiper for curved surfaces comprising an elongated body of rubbery material having a wiping edge, a flexible tension member extending lengthwise of and carried by the body, a resilient backing in the form of an elongated spring having its opposite ends connected to the opposite end portions of the tension member whereby to suspend the wiping edge for conforming engagement with a curved surface, the intermediate portion of the body being separate from but supported by the resilient backing member, the opposite end portions of the latter being free to yield toward and from the surface, and means on the backing member for mounting the same on an actuator.

12. A windshield wiper for curved surfaces comprising an elongated body of rubbery material having a wiping edge, a flexible tension member extending lengthwise of and molded into the body, a resilient backing in the form of an elongated spring shaped to urge the wiping edge into contour contact with the curved surface, means for attaching the intermediate portion of the backing to an actuating member, the opposite ends of the spring being free to yield relative to the intermediate attaching means as the wiping edge follows the contour of the curved surface, and means connecting such opposite ends of the spring to the opposite end portions of the tension member.

13. A windshield wiper for curved surfaces comprising an elongated body of rubbery material having a wiping edge, a flexible non-extensible member extending lengthwise of and molded into the body, a resilient backing in the form of an elongated spring curved into approximate contour of the curved surface, means for attaching the intermediate portion of the backing to an actuating member, such intermediate portion being free and separable from the body, and means connecting the opposite ends of the backing to the flexible member to give suspension support to the wiping edge for insuring conforming contact of the latter with the curved surface.

14. A windshield wiper for curved surfaces, comprising an elongated body of rubbery material having a laterally flexible wiping rib and coextensive flex-limiting shoulders on opposite sides of and spaced from the flexible rib to give support thereto, and torque resisting strip means incorporated in the body and having a greater width than thickness with the wider dimension extending transversely of the body and overlying the shoulders and rib for yieldably acting on the latter normally to conform the wiping rib to the curvature of the surface.

15. A windshield wiper for curved surfaces comprising a body of rubbery material having a laterally flexible wiping rib with laterally spaced flex-limiting shoulders on opposite sides of the flexible rib for alternate contact therewith as the body is moved back and forth over the curved surface, and means carried by the body and yieldably acting on the latter normally to conform the same to the curvature of the surface, said conforming means extending laterally of the wiping rib to give support also to the flex-limiting shoulders.

16. A wiper for cleaning a windshield surface comprising a unit including an elongate blade having a relatively wide back portion and a projecting wiping edge extending longitudinally and medially thereof, and a continuous non-extensible backing strip having its broad dimension lying transversely of the wide back portion of the blade and extending across a major portion of the width thereof and substantially centrally with respect thereto, said backing strip being flexible in a direction normal to said surface and in supporting relation with the wide back portion of the blade substantially throughout its length to maintain the latter against lateral distention while permitting surface conforming flexure of said backing strip and blade, an elongate holding structure superimposed above the backing strip and having its end portions of sufficient width to extend substantially entirely across the end portions of the backing strip and engaging said unit for applying pressure normal to the surface upon both longitudinal marginal areas of the strip to restrict the backing strip and blade against undesirable rotational movement about their longitudinal axes, the medial portion of said holding structure being longitudinally substantially arcuate to permit a flexing of the strip for a substantial mutual nesting of the strip and blade with relation to the holding structure when conforming to a curved surface, and connecting elements between the holding structure and backing strip, said connecting elements extending from the end portions of the holding structure and engaging lateral wall portions of said backing strip to prevent substantial relative lateral displacement between the backing strip and holding structure while permitting surface conforming flexure of the backing strip, whereby pressure of the end portions of the holding structure upon both lateral edges of the backing strip will be available at all times.

17. A wiper for cleaning a windshield surface comprising a unit including an elongate flexible blade having a relatively wide back portion and a projecting wiping edge extending longitudinally thereof, and a continuous non-extensible backing strip having its broad dimension lying transversely of the wide back portion of the blade and extending across a major portion of the width thereof and substantially centrally with respect thereto, said backing strip being flexible in a direction normal to said surface and in supporting relation with the wide back portion of the blade substantially throughout its length to maintain the latter against lateral distention while permitting it to have surface conforming flexure with said blade, an elongate holding structure above the backing strip having end portions of sufficient width to extend substantially entirely across the end portions of the backing strip and the adjacent longitudinal marginal areas thereof and engaging said unit for applying pressure normal to the surface through said adjacent longitudinal marginal areas of the strip to restrict the backing strip and blade against undesirable rotational movement about their longitudinal axes, the medial portion of said holding structure being longitudinally substantially arcuate to permit a flexing of the strip substantially into mutual nesting with the holding structure when conforming to a curved surface, and connecting interlocking parts between the end portions of the holding structure and said backing strip to prevent substantial relative lateral displacement between the backing strip and holding structure whereby the end portions of the holding structure are retained upon both longitudinal marginal areas of the backing strip for so applying the pressure thereto while permitting surface conforming flexure of the backing strip, said connecting parts having a play connection with the backing strip to enable its surface conforming flexure.

18. A wiper for cleaning a windshield surface comprising a unit including an elongate blade having a relatively wide back portion and a projecting wiping edge extending longitudinally and medially thereof, and a continuous non-extensible backing strip having its broad dimension lying transversely of the wide back portion of the blade and extending across a major portion of the width thereof and substantially centrally with respect thereto, said backing strip being flexible in a direction normal to said surface and in supporting relation with the wide back portion of the blade substantially throughout its length to maintain the latter against lateral distention while permitting surface conforming flexure of said backing strip and blade, an elongate holding structure for the backing strip having end portions arranged above the ends of the strip and of a width to be superimposed above the marginal longitudinal edges thereof and engaging said unit for applying pressure normal to the surface upon such marginal edges to restrict the backing strip and blade against undesirable rotational movement about their longitudinal axes, the medial portion of the holding structure being arched upwardly to permit a flexing of the backing strip up thereinto when conforming to a curved surface, and members extending downwardly from the end portions of the holding structure and spaced laterally of the areas of marginal contact between the holding structure and the backing member and interlocking with the backing strip to restrain the holding structure and backing strip against substantial relative lateral movement, but permitting said surface conforming flexure of the backing strip.

19. A windshield wiper for a curved surface, comprising an elongate flexible blade having a laterally flexible wiping edge and co-extensive flex-limiting shoulders spaced at opposite sides from the wiping edge for alternate supporting engagement thereby as the body is moved back and forth sideways over the curved surface, a backing strip flexible normal to said surface supporting said blade and yieldably acting on the latter normally to conform the same to the curvature of the surface, said conforming backing strip having its broad dimension extending laterally of the wiping edge to give support also to the flex-limiting shoulders, and an elongate holding structure arranged above the backing strip and having end portions overlying the longitudinal marginal edges of the backing strip for applying pressure thereto, said holding structure being connected to the opposite end portions of the backing strip, said connection permitting the medial portion of the strip and blade to have such surface conforming action but preventing substantial relative lateral movement between the backing strip and holding structure.

ANTHONY C. SCINTA.
ANTON RAPPL.

REFERENCES CITED

The following references are of record in the file of this patent:

UNITED STATES PATENTS

| Number | Name | Date |
|---|---|---|
| 1,498,155 | Dorr | June 17, 1924 |
| 1,749,049 | Turner | Mar. 4, 1930 |
| 1,771,824 | Storrie | July 29, 1930 |
| 1,811,717 | Ellixson | June 23, 1931 |
| 2,006,322 | Horton | June 25, 1935 |
| 2,063,375 | Harvey et al. | Dec. 8, 1936 |
| 2,230,489 | Grossfeld et al. | Feb. 4, 1941 |
| 2,254,343 | Zierer | Sept. 2, 1941 |
| 2,273,817 | Chellew | Feb. 24, 1942 |
| 2,303,694 | Horton | Dec. 1, 1942 |

FOREIGN PATENTS

| Number | Country | Date |
|---|---|---|
| 427,383 | Great Britain | Apr. 23, 1935 |
| 433,467 | Great Britain | Aug. 15, 1935 |
| 820,156 | France | July 26, 1937 |

Certificate of Correction

Patent No. 2,543,383 February 27, 1951

ANTHONY C. SCINTA ET AL.

It is hereby certified that error appears in the printed specification of the above numbered patent requiring correction as follows:

Column 3, line 41, strike out the word "spring"; column 5, line 59, for "ribs" read *rib*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*